United States Patent
Holder (10) Patent No.: US 7,327,270 B2
(45) Date of Patent: Feb. 5, 2008

(54) APPARATUS AND METHOD FOR DETECTING THE PRESENCE OF RADIOACTIVE MATERIALS

(76) Inventor: Michael D. Holder, 22117 NE. 80th St., Redmond, WA (US) 98052

( * ) Notice: Subject to any disclaimer, the term of this patent is extended or adjusted under 35 U.S.C. 154(b) by 0 days.

(21) Appl. No.: 10/977,461

(22) Filed: Oct. 29, 2004

(65) Prior Publication Data
US 2007/0273538 A1 Nov. 29, 2007

Related U.S. Application Data

(60) Provisional application No. 60/516,239, filed on Oct. 31, 2003.

(51) Int. Cl.
*G08B 17/12* (2006.01)

(52) U.S. Cl. .................. 340/600; 340/539.26; 340/506

(58) Field of Classification Search ............... 340/600, 340/663, 632, 634, 506, 539.26; 378/57, 378/62; 250/394, 395; 422/22, 62
See application file for complete search history.

(56) References Cited

U.S. PATENT DOCUMENTS

| | | | | |
|---|---|---|---|---|
| 5,246,005 A | * | 9/1993 | Carroll et al. | 600/431 |
| 6,592,816 B1 | * | 7/2003 | Ebel et al. | 422/62 |
| 6,727,506 B2 | * | 4/2004 | Mallette | 250/394 |
| 6,768,421 B1 | * | 7/2004 | Alioto et al. | 340/600 |
| 6,965,314 B2 | * | 11/2005 | Bohinc, Jr. | 340/539.26 |
| 7,026,944 B2 | * | 4/2006 | Alioto et al. | 340/600 |

* cited by examiner

*Primary Examiner*—Van T. Trieu
(74) *Attorney, Agent, or Firm*—Eric G. Halsne (57) ABSTRACT

A passive radiation sensor suitable for homeland security applications or other monitoring of locations deemed at high risk to radiation exposure. The sensor further incorporates a method to provide a statistically derived detection threshold algorithm that guarantees a predetermined and configurable false-alarm rate and rapid detection of low-level radiation.

20 Claims, 8 Drawing Sheets

FIG. 1 – Poisson Distribution

APPARATUS AND METHOD FOR DETECTING THE PRESENCE OF RADIOACTIVE MATERIALS

BACKGROUND OF THE INVENTION

Recently, governments, law enforcement agencies, and investigators have warned of possible terrorist attacks involving radioactive materials. A so-called "dirty bomb" threat exists that could terrorize a population center by scattering Cesium 137 powder with conventional explosives. Talcum powder light, radioactive Cesium would disperse into the air to contaminate a wide area creating a hot-zone nightmare.

Radioactive materials are also used in a wide range of legitimate activities, from medical research and treatments to industrial processing and testing. Even using radioactive material in a legitimate fashion, people have been injured by accidental exposures to industrial radioisotopes. Loss of medical radiation sources is a constant concern.

Detecting the presence of radioactive materials is thus an important component of public safety. For example, it would be useful to know if terrorists were using a facility to stage an attack or to hide a dirty bomb. It would also be important to detect whether an industrial radioactive source was inadvertently exposing personnel to gamma radiation. A device to detect whether criminals are using ports or other transportation facilities to move radioactive or fissile materials, whether first-responders to an incident have entered a hot zone at the site of a bomb blast, or whether police officers have unknowingly stopped a vehicle carrying radioactive contraband would also be an important contributor to public safety.

The current radiation detection art comprises two methods. In the first, personnel who otherwise suspect the presence of radiation, perhaps by circumstance, use portable hand-held radiation survey meters to manually scan a suspected radioactive area. Typically these devices are battery operated, or are rechargeable, and are deployed only when a particular suspicion is raised. Because the equipment is rarely used it tends to be neglected. Thus, when needed most, the monitoring equipment is usually unavailable to respond to an emerging situation or threat.

If radiation equipment is permanently installed to monitor a defined area, the equipment must deal with background radiation levels, which may change slowly over time. Background radiation levels are typically low and erratic, such that it is difficult to discern when small changes in the rate occur. Conventional radiation monitors use long-time-constant low-pass filters to track the average rate. To achieve finer resolution longer time constants are employed. The simplest method of filtering is to count the number of events in a period of many seconds or minutes to compute the average rate. Such use of low-pass filtering or counting techniques is not well suited to homeland security applications where the offending radioactive source may be present for only a brief period of time.

In the second method, individuals who work in areas that have a perceived higher risk for radiation exposure wear a portable radiation dosimeter which sums the radiation exposure to the device. A disadvantage to wearable dosimetry is that specialized training and equipment is generally required to read the radiation dose gathered by the dosimeter, usually hours or days after the exposure. An individual may be able to assess the past radiation exposure with a dosimeter, but the knowledge would come too late to avert or respond to a transient incident. In addition, specially trained operators are required to judge whether the levels of radiation are indeed unusual or are the result of some explainable, legitimate, activity.

Thus, what is needed is a method and apparatus which can provide long-term monitoring for radiation, with high accuracy and specificity, and which can detect and respond as quickly as possible to a transient radiation incident. The effectiveness of such an apparatus is significantly enhanced if it could be implemented in an inexpensive and compact package that can be widely distributed.

SUMMARY OF THE INVENTION

The present invention is a passive radiation sensor suitable for homeland security applications or other monitoring of locations deemed at high risk to radiation exposure. The present invention further comprises a method to provide a statistically derived detection threshold algorithm that guarantees a predetermined and configurable false-alarm rate and rapid detection of low-level radiation. The radiation sensor apparatus is disposed to reduce the amount of analog circuitry required. The sensor also monitors for sensor health. The apparatus further employs a method to eliminate automatically compensate for varying background radiation levels. Overall, the radiation sensor is accurate enough to be deployed in automated surveillance systems without generating an excessive number of false alerts, while simultaneously retaining a high sensitivity to real radiation events. The present invention can be integrated with asset tracking and communication systems, or with a facility's centrally monitored security/fire protection system to enhance its ability to detect and report hazardous radiation sources.

Specifically, one object of the present invention is a radiation sensor with high sensitivity and instant alerting which is disposed in a compact and inexpensive package.

Another object of the invention is a novel method of radiation event detection using statistical analysis. The method permits dynamic radiation background level control, requires no clock, and automatically eliminates statistically unlikely radiation detection events. The method also permits instantaneous alerting of statically significant radiation detection events, and allows for identification of radiation levels which saturate the device. Visual or aural alerting means, such as an LED or a piezoelectric buzzer, warn the user of radiation event detections.

Another object of the invention is a radiation detection apparatus which consumes minimal electric power and can operate on a battery for an extended period of time. The apparatus operates effectively at a low duty cycle by digitizing much of the analog circuitry utilized in prior art devices, by integrating most of the high voltage sensor management into a single component, and by reducing the computational overhead necessary to detect a radiation event greater than the background level.

Another object of the invention is a self-testing radiation detection apparatus, which can determine whether the sensor element is operating properly. Visual or aural means are used to alert the user to faults in the device.

Another object of the invention is a radiation detection apparatus which is constructed of lower cost components and can be implemented in a small form factor less than three cubic inches. Such a device is inexpensive enough and small enough to be unobtrusively distributed in a large number of locations.

Another object of the invention is a radiation detection apparatus which can be interfaced with a centralized security monitoring system, in which the apparatus can be set for a known and configurable false alerting rate. Valid alerts are communicated electronically to the monitoring system.

Another object of the invention is a radiation detection apparatus which can be used by untrained personnel without requiring periodic calibration for changing background levels of radiation or maintenance.

DESCRIPTION OF PREFERRED EMBODIMENTS

Radioactive isotopes (also called radioisotopes) have unstable nuclei. These isotopes disintegrate to form atoms with stable nuclei by the release of subatomic particles and gamma rays (akin to X-rays). The radioactive elements are referred to as parent atoms; the atoms they disintegrate to form are called daughter products.

Some isotopes release an alpha particle during nuclear disintegration; an alpha particle consists of two protons and two neutrons (equivalent to the nucleus of an atom of helium). Others release a beta particle, which is an electron, or negatively charged nuclear particle. Beta particles originate in the nucleus, presumably by breakdown of a neutron into its proton-electron components. Gamma rays are released during both types of radioactive decay.

Some isotopes decay and immediately produce a stable daughter product. For example, one-step decays to stable daughters are completed by the radiogenic isotopes $^{14}C$ (decaying to $^{14}N$ by the beta process), and $^{87}Rb$ (decaying to $^{87}Sr$ by the beta process). Others decay and produce unstable daughters, which then become the parent products of their own daughters. Unstable isotopes producing unstable daughters form a radioactive decay chain. For example, the $^{235}U$ decay chain eventually produces $^{207}Pb$, a stable daughter.

Each atom of a radioisotope is independent of other atoms, there are an extremely large number of atoms in the bulk material, and the probability that an individual atom will disintegrate is small, therefore the probability of a radiation event occurring and being detected can be modeled by Poisson's Distribution.

$$P(X = x) = \frac{\mu^x e^{-\mu}}{x!}$$ Eq. 1 where x is the number of events in a period of time, and μ is the average rate.

Figure 1:
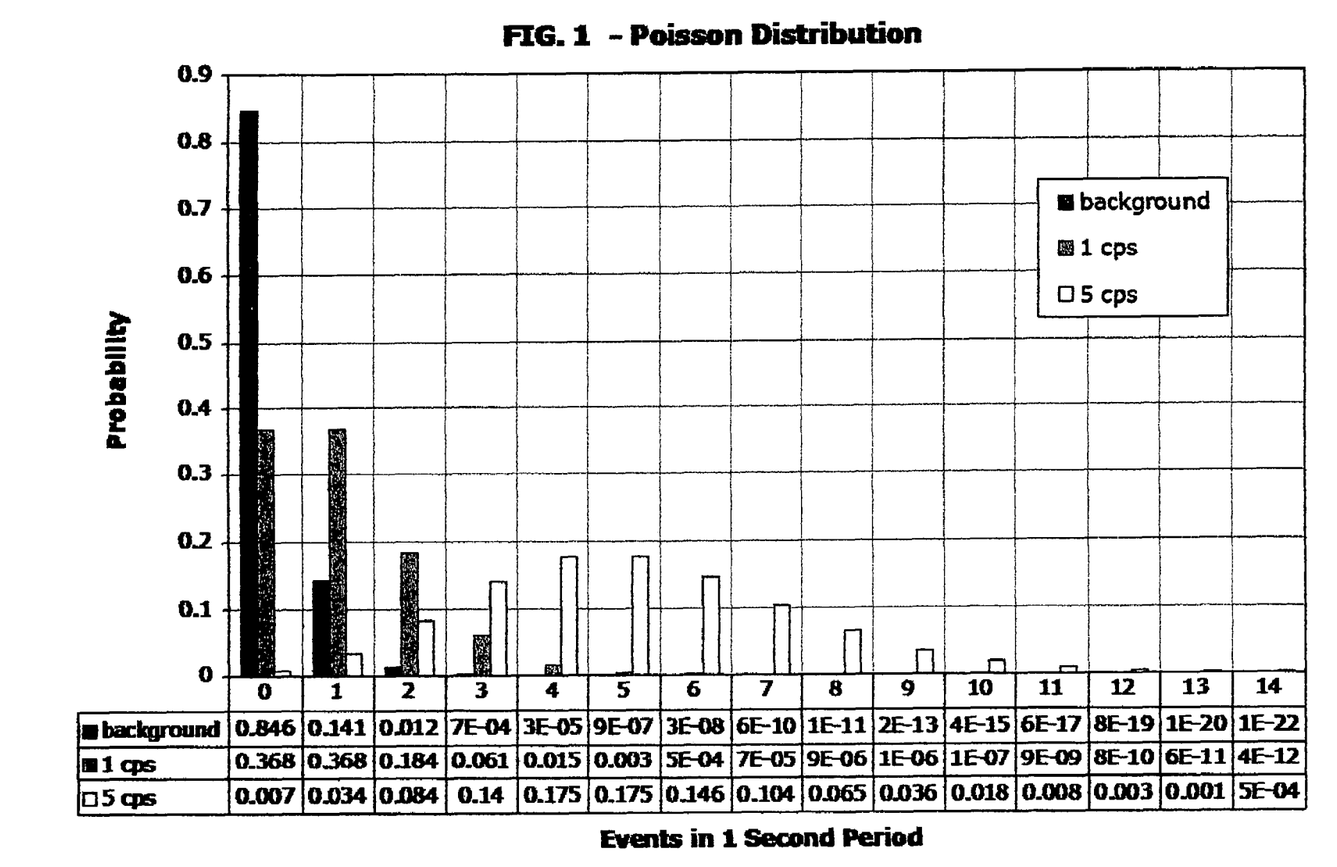
FIG. 1 shows the Poisson probability that x events will take place in a one second period; namely at one background radiation level of 0.1666 counts per second (cps), at one cps, and at five cps.

FIG. 1 shows the Poisson probabilities for three different average rates of radiation events: 1) Background at about 0.1666 cps; 2) One cps; and 3) Five cps.

FIG. 1 shows the probability that x events will take place in a one second period. FIG. 1 further illustrates the probability that x events will take place in a one second period. At the background rate depicted in FIG. 1 there is an 85% probability that no radiation event will occur in the period of one second. At one cps this decreases to 38%, and there is an equal probability that a single event will occur in a one second period. At five cps the probability that no event will occur in one second is quite small, with the most likely count being four or five events.

Figure 2:
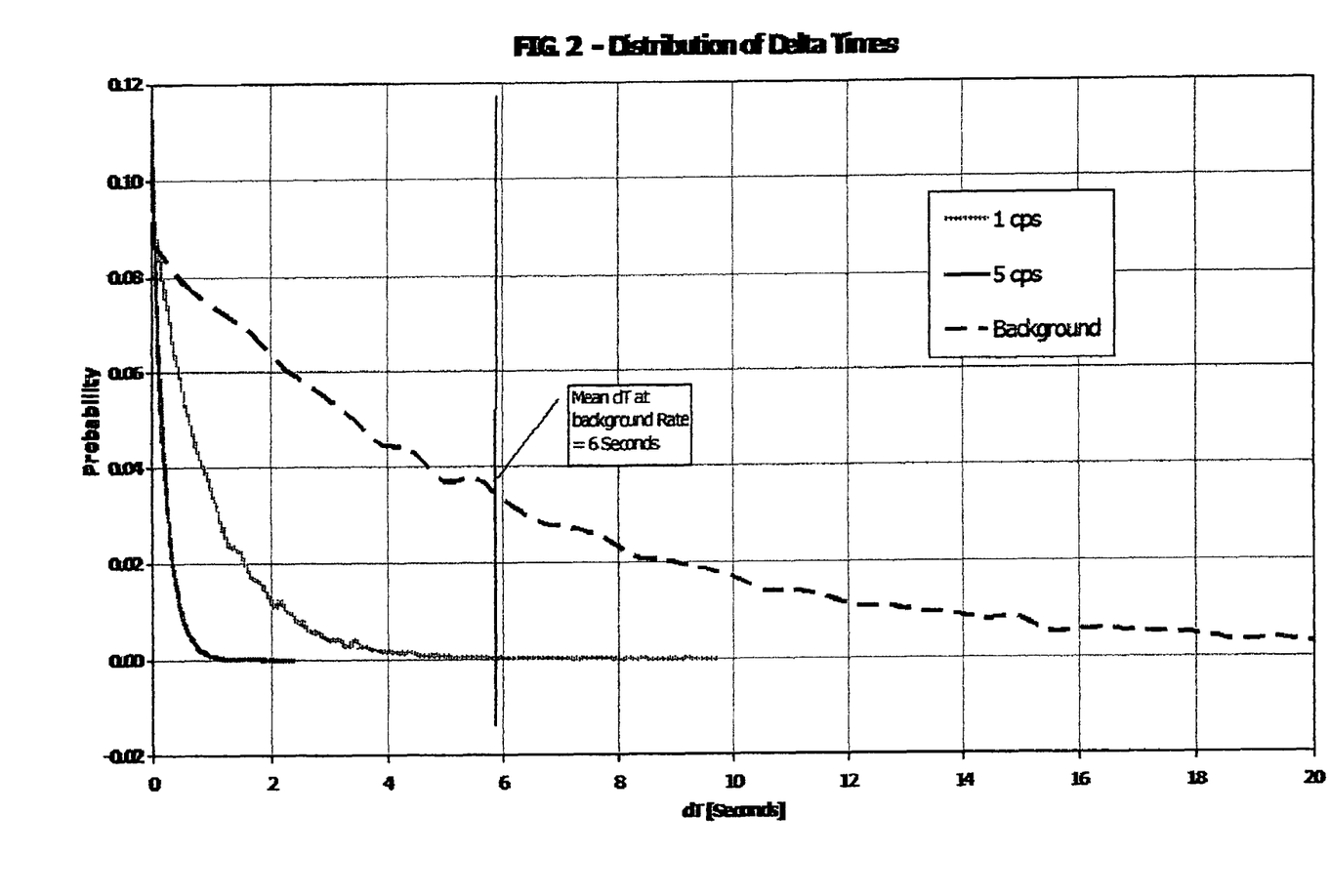
FIG. 2 is a graph of probabilities of the time difference (time delta) between radiation events, according to one embodiment of the invention.

Observation of the output of a known Geiger tube reveals the time nature of the Poisson distribution. At the normal background rate events occur over a broad range of frequencies. Events may occur two or three in quick succession, and there may also be pauses of ten to twenty seconds before another event. One illustration of the probabilities for the time delta between events is shown in FIG. 2.

At low background rates, and with such erratic variation, it is difficult to discern when small changes in the rate occur. Current art radiation monitors use long-time-constant low-pass filters to track the average rate. To achieve finer resolution longer time constants are employed. The simplest prior art method of filtering is to count the number of events in a period of many seconds or minutes to compute the average rate.

The present invention comprises a novel radiation threshold detection method applied to a novel digitizing circuit, which, combined with existing radiation detector technology, provides an enhanced passive sensor capability. The present invention also enables a low-cost solution while providing respectable performance. Most importantly, the invention enables enhanced response time, and minimizes nuisance alerts. The inventive method comprises statistical algorithms to determine when an alert is generated. Alerts are generated in the shortest time possible given the level of background radiation, and the intensity of the offending source. In addition, the invention continuously monitors the health of critical circuitry and provides an output to indicate a failed condition. An LED indicator is also provided to aid installation and checkout.

Description of the Inventive Method

The threshold method used for this passive radiation detector is preferably based on the Poisson probabilities of the time between successive radiation events, or dT. However, other probability distributions, such as a Gaussian distribution, could be used.

Figure 3:
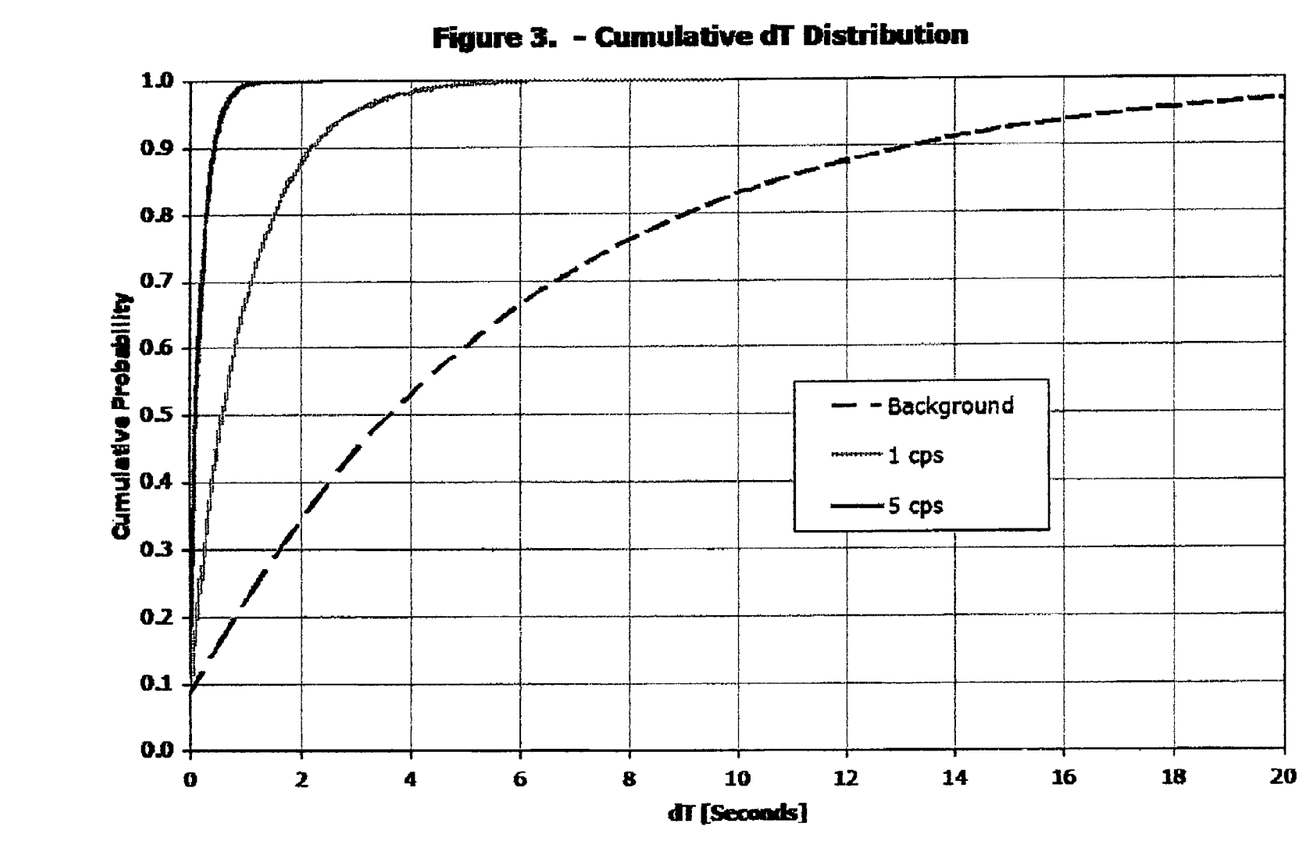
FIG. 3 illustrates the cumulative probability of radiation events occurring less than a threshold time (dT) after the previous event at the exemplary background rate, and at rates illustrating the presence of radioactive materials cited previously.

The result of a computer simulation of radioactive events at three rates is illustrated in FIG. 2. Probability is plotted with respect to the time between successive radiation events dT. The background rate is about six seconds' average between events, which correlates to a rate of 0.1666 cps. FIG. 3 illustrates that approximately 63% of radiation events occur less than six seconds (the mean) after the previous event at the background rate. Table 1 summarizes the distribution of times between events for the background rate.

TABLE 1

Poisson distribution of Time Between Events at the Background Rate

| Seconds Between Events (dT) | Cumulative Probability |
|---|---|
| <1 | 15% |
| <2 | 28% |
| <3 | 39% |
| <4 | 49% |
| <5 | 57% |
| <6 | 63% |
| <7 | 69% |
| <8 | 74% |
| <9 | 78% |
| <10 | 81% |
| <11 | 84% |
| <12 | 86% |
| <13 | 89% |
| <14 | 90% |
| <15 | 92% |
| <16 | 93% |
| <17 | 94% |

Given this distribution of times between events one can calculate the likelihood of combinations of events. For example, three events with dT less than the background mean would have a probability of:

$$P(2<\overline{dT})=0.63*0.63=0.40$$

That is, 40% of the time three successive radiation events will have dT less than the mean. Similarly, three successive events with dT less than ⅓ of the mean would have the probability:

$$P(2<\overline{dT}/3)=0.28^2=0.078$$

In general, we can calculate the probability of n events with dT less than a threshold by:

$$P(n<\overline{Th})=Pr_{Th}{}^n \qquad \text{Eq. 2}$$

$Pr_{Th}$ is the cumulative probability for the time between events used as the threshold, or $$Pr(dT<x)=1-e^{-x\mu} \qquad \text{Eq. 3}$$

where μ is the average rate and x is the chosen threshold.

At the background level, there is less than 1 part per million likelihood of thirty events in succession with dT less than the mean. There is less than 1 part per million likelihood of 11 events in succession with dT less than a $\overline{dT}/3$ threshold.

It has been observed that the background pulse rate of radiation detectors of the preferred type is generated largely from the radiation events taking place in the detector's own materials. Normal background radiation from external sources generates a very small number of radiation events on this scale. Thus, the main challenge for detecting radiation sources is in discerning when the rate of events exceeds the normal background rate while keeping nuisance alarms to an acceptable level.

Multiple-Threshold Detection Algorithm

Consider one four-threshold detection scheme in Table 2 below. The number of successive event dT occurrences below the threshold are chosen to produce a 1×10⁻⁶ nuisance alert rate for each threshold, or a 4×10⁻⁶ total probability.

TABLE 2

Thresholds, Pr, and, Counts Thresholds for Preferred Multi-Threshold Scheme

| Threshold = $\overline{dT}$ divided by | Cumulative Probability | Counts Threshold for 1 × 10⁻⁶ Nuisance Rate |
|---|---|---|
| 1 | 63.2% | 30 |
| 2 | 39.3% | 15 |
| 3 | 28.3% | 11 |
| 4 | 22.1% | 9 |

Figure 4A:
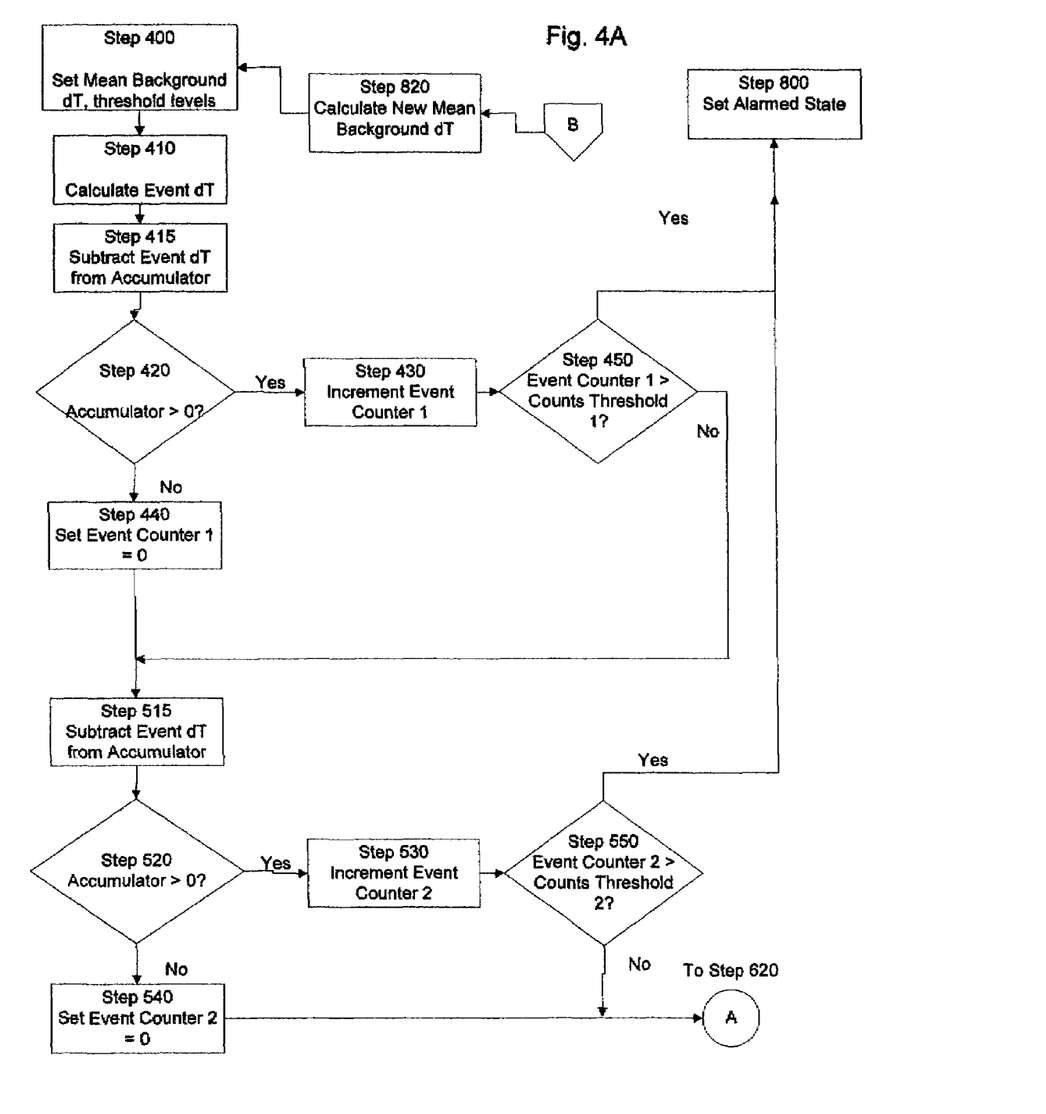
FIGS. 4A, 4B, and 4C illustrate a flow chart of the inventive detection algorithm.
Figure 4B:
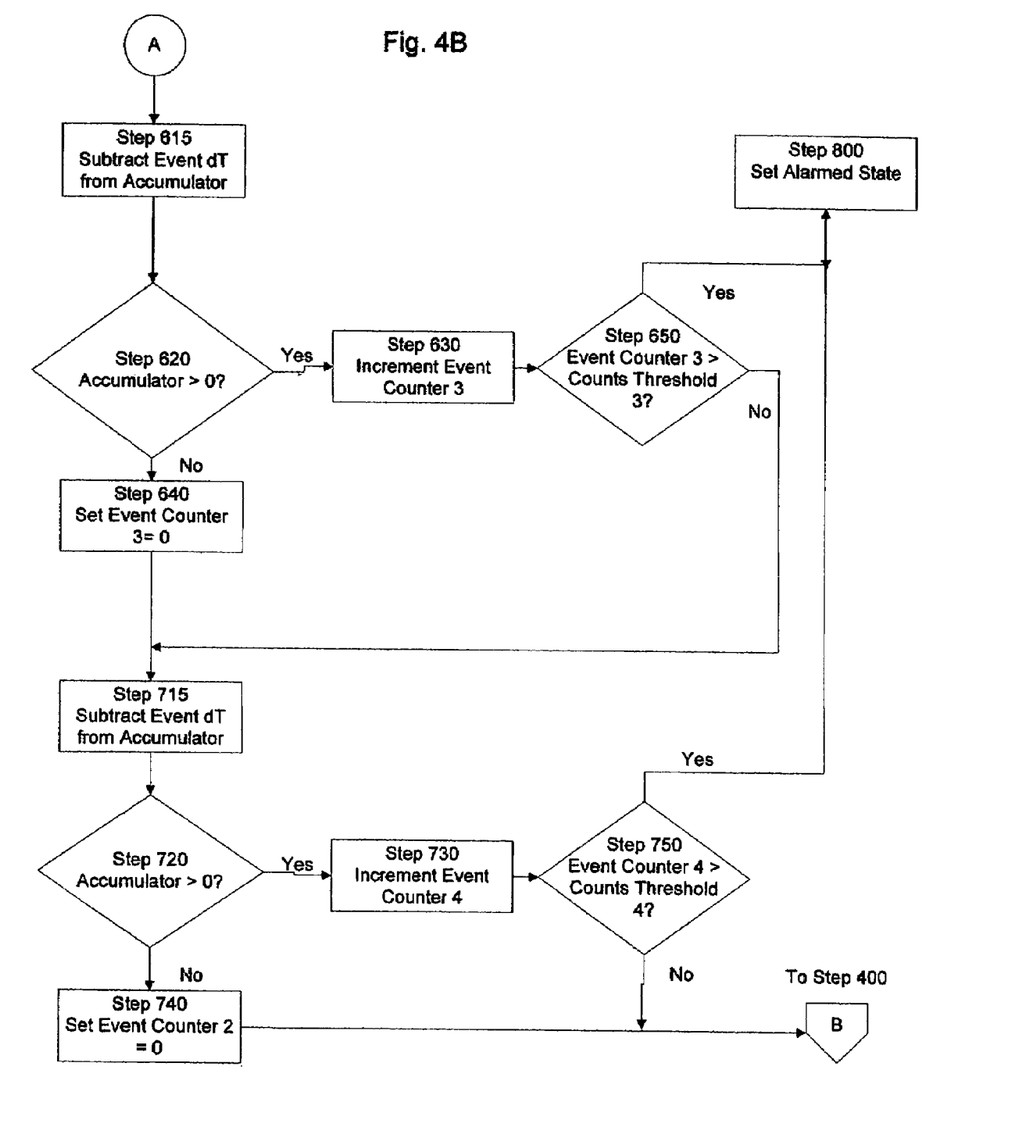

Referring to FIGS. 4A and 4B, the preferred embodiment of the four-threshold detection algorithm is modeled as a Finite State Machine with two states: NORMAL and ALARMED. While in the NORMAL state the following processing steps occur for each radiation event.

A 24-bit Accumulator in the microcontroller 100 is set to the mean background dT period, and first threshold $\overline{dT}$, second threshold $\overline{dT}/2$, third threshold $\overline{dT}/3$, and fourth threshold $\overline{dT}/4$ is calculated in step 400. In step 410, an event dT comprising the elapsed time between two detected radiation pulses in the radiation detector 110 output is calculated by the microcontroller 100. The event dT is subtracted from the Accumulator value in step 415, and if the result is >0 in step 420, then the Event Counter for Threshold 1 is incremented, step 430. Otherwise the Event Counter for Threshold 1 is set to zero in step 440.

In step 450, if the Event Counter exceeds the Counts Threshold for Threshold 1 (thirty counts) then the ALARMED state is entered at step 800.

The second threshold ($\overline{dT}/2$) is subsequently analyzed in step 515 by subtracting the same event dT from the Accumulator result as calculated in step 415. If the result is >0 in step 520, then the Event Counter for Threshold 2 is incremented, step 530. Otherwise the Event Counter for Threshold 2 is set to zero in step 540.

In step 550, if the Event Counter exceeds the Counts Threshold for Threshold 2 (fifteen counts) then the ALARMED state is entered at step 800.

The third threshold ($\overline{dT}/3$) is subsequently analyzed in step 615 by subtracting the same event dT from the Accumulator result as calculated in step 515. If the result is >0 in step 620, then the Event Counter for Threshold 3 is incremented, step 630. Otherwise the Event Counter for Threshold 3 is set to zero in step 640.

In step 650, if the Event Counter exceeds the Counts Threshold for Threshold 3 (eleven counts) then the ALARMED state is entered at step 800.

The fourth threshold ($\overline{dT}/4$) is subsequently analyzed in step 715 by subtracting the same event dT from the Accumulator result as calculated in step 615. If the result is >0 in step 720, then the Event Counter for Threshold 4 is incremented, step 730. Otherwise the Event Counter for Threshold 2 is set to zero in step 740.

In step 750, if the Event Counter exceeds the Counts Threshold for Threshold 4 (nine counts) then the ALARMED state is entered at step 800.

If no Counts Threshold is exceeded in any of the four threshold analyses, the NORMAL state continues. In this case, the present Event dT passes through a 1$^{st}$ order Infinite Impulse Response (IIR) Filter, also known as an "Alpha Filter", to calculate a new mean background event time in step 820. IIR filters are a class of discrete-time filters that are continuous and infinite in the time domain. The $1^{st}$-order IIR is mathematically equivalent to an unloaded Resistor-Capacitor analog filter. The new mean background event delta time is calculated by the following equation:

$$dt\text{Mean}_{n+1} = (1-\text{Alpha}) * dt\text{Mean}_n + dt_n * \text{Alpha} \qquad \text{Eq. 4}$$

where n is the current radiation sensor event. DtMean$_{n+1}$ is the new output of the filter, i.e. the new mean background event time. dtMean$_n$ is the previous mean background event time. dt$_n$ is the dt from the current Geiger event. Alpha, which is equivalent to the 1/RC time constant in an analog filter, is the inverse of the filter time constant. In the preferred embodiment, Alpha is $\frac{1}{256}$. The 256 events at an approximate background rate of one every six seconds equates to a time constant of about 25 minutes. Thus, after a step change in detected radiation, the background radiation level calculation would "settle" in no less than two hours. Thus, the present method of detection accounts for radiation sources which are transient in the environment. Any changes in background that occur slower than the time constant are assumed to be unrelated to the introduction of a new non-background radiation source.

An Alpha of $\frac{1}{256}$ further allows one to use shifting, addition, and subtraction to implement the IIR filter:

$$dt\text{Mean}_{n+1} = dt\text{Mean}_n - (dt\text{Mean}_n >> 8) + (dt_n >> 8) \qquad \text{Eq. 5}$$

where ">>8" indicates shifted 8 bits to the right or LSB. This is equivalent to division by 256. Underflowing of the shifted values is avoided by employing an extra byte in the dtMean value.

Figure 4C:
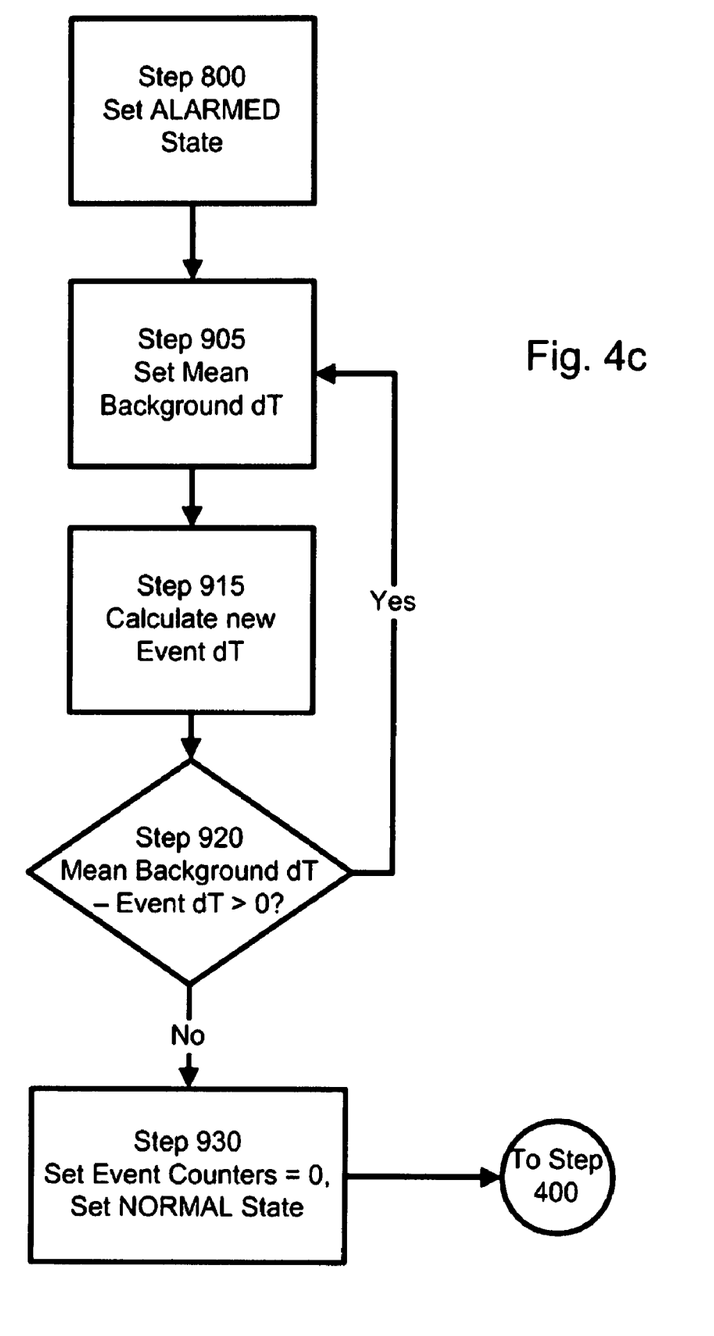

When the ALARMED state is entered at any step, the following processing steps are followed for each radiation event. At step 900, the 24-bit Accumulator is set to the mean background dT period of step 400. In step 910, a new event dT comprising the elapsed time between two subsequent detected radiation pulses in the radiation detector output is calculated by the microcontroller 100. The new event dT is subtracted from the Accumulator in step 920, and if the result is >0, then the ALARMED state is maintained, and the process returns to step 900. If the resulting value in the Accumulator is <0, then the Event Counters for all 4 thresholds are set to 0, and the NORMAL state is set at step 930. The process then returns to step 400.

While in the ALARMED state the IIR filter for averaging the background rate is not computed, and the mean rate reflects the background event period prior to the ALARMED condition.

The algorithm described above solves the problem of realizing multiple-threshold detection on low-cost microprocessors. Radiation event dTs range from a few microseconds to several seconds. This dynamic range requires 24 bits of resolution to represent. Implementing multi-byte division of the threshold level, once for each of the fractional thresholds desired, would consume more processing time, and therefore electrical power. Arithmetic functions for multiple-byte values must be implemented in assembly language for maximum efficiency. The above simplification of the threshold function provides an opportunity to eliminate the need for division of the required 24 bit threshold values. Thus the complexity and power consumption in the processing is reduced.

Description of the Inventive Apparatus

Figure 5:
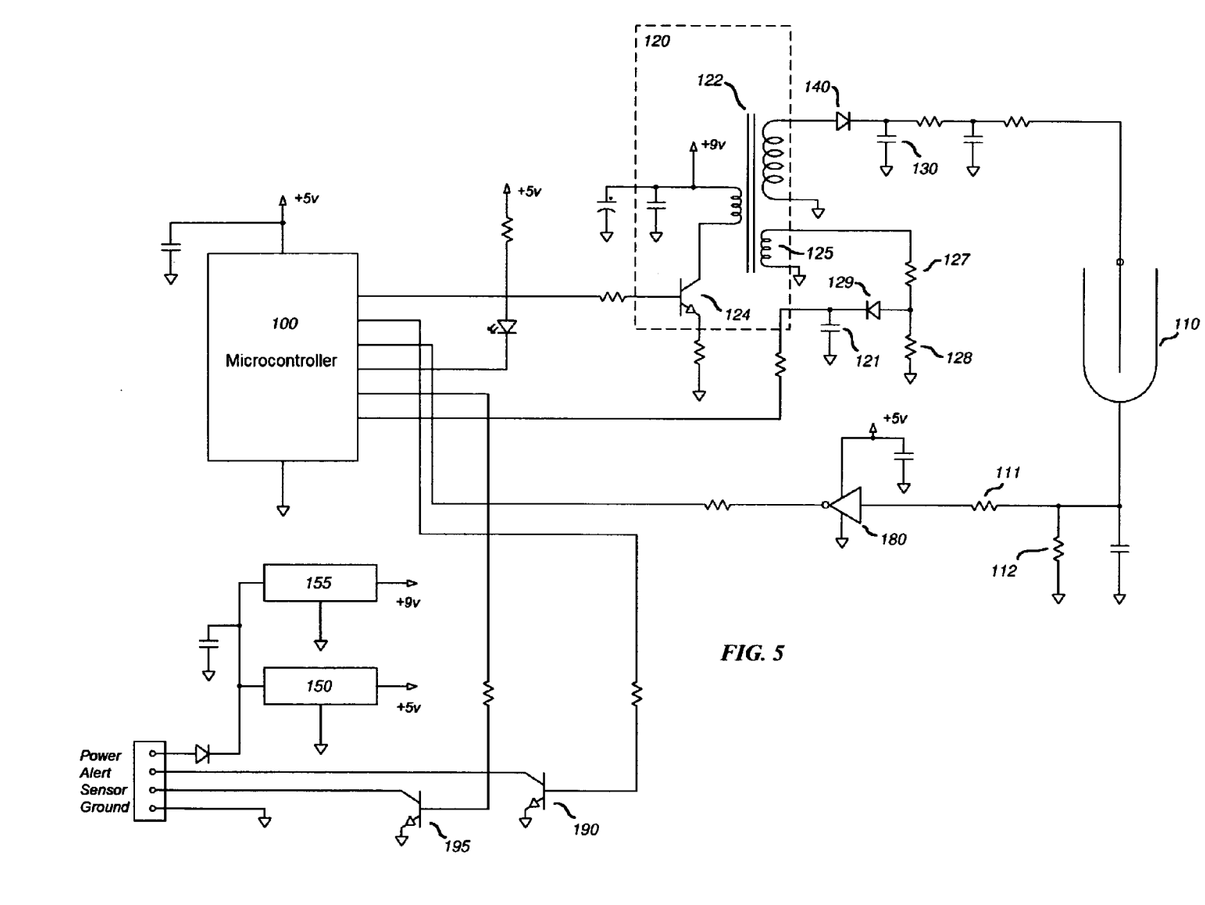
FIG. 5 is a schematic circuit diagram of one embodiment of the present invention.

A schematic diagram of a preferred embodiment of the invention is shown in FIG. 5. Turning to FIG. 5, the passive radiation sensor comprises six main elements:

Microcontroller 100.

Radiation detector 110, as exemplified by a Geiger-Mueller Tube or a scintillation crystal and photomultiplier.

A fly-back power supply 120 for supplying power to the radiation detector 110.

Pulse digitizing element 180.

Input power regulators 150, 155.

Alert output interface 190 and sensor health output interface 195.

Microcontroller 100 performs at least three functions. It controls the generation of high voltage bias to the radiation detector element, monitors for failure of the circuit, and processes radiation events to detect a statistically unusual level of radiation. The functions of the microcontroller 100 are described in more detail below.

Radiation detector 110 is preferably a halogen-quenched neon gamma detector. Alternatively, sensors for detecting other types of radiation, such as beta, alpha or neutron detectors, known in the art, can be used as desired for the particular function. A scintillation crystal and photomultiplier tube or avalanche photodiode, which require similar high voltages, can alternatively be used for the radiation detector 110. These would generate different background event rates than the G-M tube, but would be more sensitive. The Geiger-Mueller radiation detector of the preferred embodiment, as with most radiation detectors, requires a controlled 500-volt bias for proper functioning.

A fly-back power supply 120 provides input power at approximately bias voltage to radiation detector 110. Fly-back power supply 120 is comprised of a transformer 122 and a pulse generator 124. Microcontroller 100 stimulates the transformer 122 primary to generate and regulate the bias voltage by driving pulse generator 124 on for approximately 5 microseconds. This charges the primary coil of transformer 122. When pulse generator 124 turns off, the secondary coil in transformer 122 develops a high-voltage pulse that is delivered to high voltage capacitor 130 through rectifier 140. Initially, many fly-back cycles are needed to charge high voltage capacitor 130 to the required 500 Volts. A sensing winding 126 on fly-back transformer 122 provides an operating voltage indication back to microprocessor 100 such that microprocessor 100 can determine when the desired voltage has been achieved, and subsequently stop the operation of pulse generator 124. In one embodiment, the sensing winding 126 is a single turn which provides approximately 6 volts when the secondary coil is at 500 volts.

Sensing winding 126 sends a fly-back transformer 120 output voltage signal to microcontroller 100 via voltage divider resistors 127, 128, rectifier 129 and sensing capacitor 121. Voltage on sensing capacitor 121 is proportional to the voltage on high voltage capacitor 130 immediately following each fly-back cycle. Leakage current from sensing capacitor 121, through internal resistance and the load provided thereby, reduces its voltage between pulses. Sensing capacitor 121 acts as a sampling mechanism to hold briefly the voltage presented by the sensing winding 126 so that Microcontroller 100 can digitize its peak value. Microcontroller 100 thus digitizes this voltage and regulates the pulse generator 124 drive pulses to maintain 500 volts on high voltage capacitor 130.

Once the proper bias voltage is present on radiation detector 110, radiation detector 110 generates an electrical pulse at each detected radiation event. When radiation strikes radiation detector 110, radiation detector 110 becomes electrically conductive for a few micro-seconds.

Discharge voltage divider resistors 111, 112 are disposed to output a pulse of approximately 8 volts at its peak, decaying back to 0 Volts after a few microseconds. Pulse digitizing element 180 cleanly digitizes the output pulse for further processing in microcontroller 100. Preferably, pulse digitizing element 180 is an advanced High-Speed CMOS Schmitt Trigger.

A square pulse of approximately 2 microseconds is produced by pulse digitizing element 180 which then passes to the interrupt input of microprocessor 100. The combination of voltage divider formed by 111, 112 and pulse digitizing element 180 eliminates the need for the FET preamplifier commonly found in prior art Geiger-Mueller detector circuits.

The interrupt input signals microcontroller 100 to capture the elapsed time from the previous interrupt signal, defining an event, using a timer built into microcontroller 100. Subsequent processing of the event is in accordance with the afore-described method. With each event, microcontroller 100 calculates a time interval dT by subtracting the previous event time. The threshold radiation detection algorithm in the sensor apparatus is thus based upon the measured dT for each successive event, rather than computing event rates as is performed in prior art practice. The sensor apparatus maintains a computed average of all previous dTs using a first order Infinite Impulse Response (IIR) digital filter implemented in microcontroller 100. The accumulation of this average is inhibited when the sensor is in the alarmed state. The dT threshold is based on the mean dT value.

An advantage of the afore-described event driven method is that microcontroller 100 is inactive for most of its duty cycle, except when processing a radiation event. This feature dramatically reduces the power consumed.

When an alarmed condition is detected, microprocessor 100 turns on alert output interface 190, which in turn may be used to power visual, aural, or electronic alerting elements, not pictured. Alert output interface 190 can alternately be interfaced to an environmental surveillance system to provide radiation monitoring functionality.

Microprocessor 100 further utilizes a self-testing algorithm to determine if radiation detector 110 is functioning properly. Normal background radiation will trigger a normally functioning radiation detector 110 periodically. If no such trigger events are detected, a fault in radiation detector 110 may be present. A fault in the high voltage generating circuitry, a fault in the pulse detection circuitry, or saturation of the detector by high radiation levels could also cause this condition. In the case of saturation, pulse digitizing element 180 will never generate a pulse for microprocessor 100, because the current through radiation detector 110 will be seen at pulse digitizing element 180 as a constant voltage. Radiation detector 110 saturation can be discriminated from a sensor fault condition by sensing the increased current through fly-back transformer 120 that is required to maintain voltage at high voltage capacitor 130 along with sensing presence of a continuous low (logic 0) output at pulse digitizing element 180. In the case of a saturated condition an alarm is indicated by turning alert output interface 190 on. Health output interface 195 is held on as long as the sensor remains healthy, and is turned off if microcontroller 100 determines a sensor fault condition through the above method.

Pulse generator 124 receives regulated input voltage through voltage regulators 150 and 155. In this embodiment, voltage regulator 150 provides regulated 5 volts to microcontroller 100 for control purposes and to pulse digitizing element 180 for detection purposes. Voltage regulator 155 provides a regulated 9 volts to fly-back transformer 122 for radiation detector 110 power. Voltage regulator 155 further limits the electrical current that can be drawn through the primary winding of fly-back transformer 122.

Figure 6:
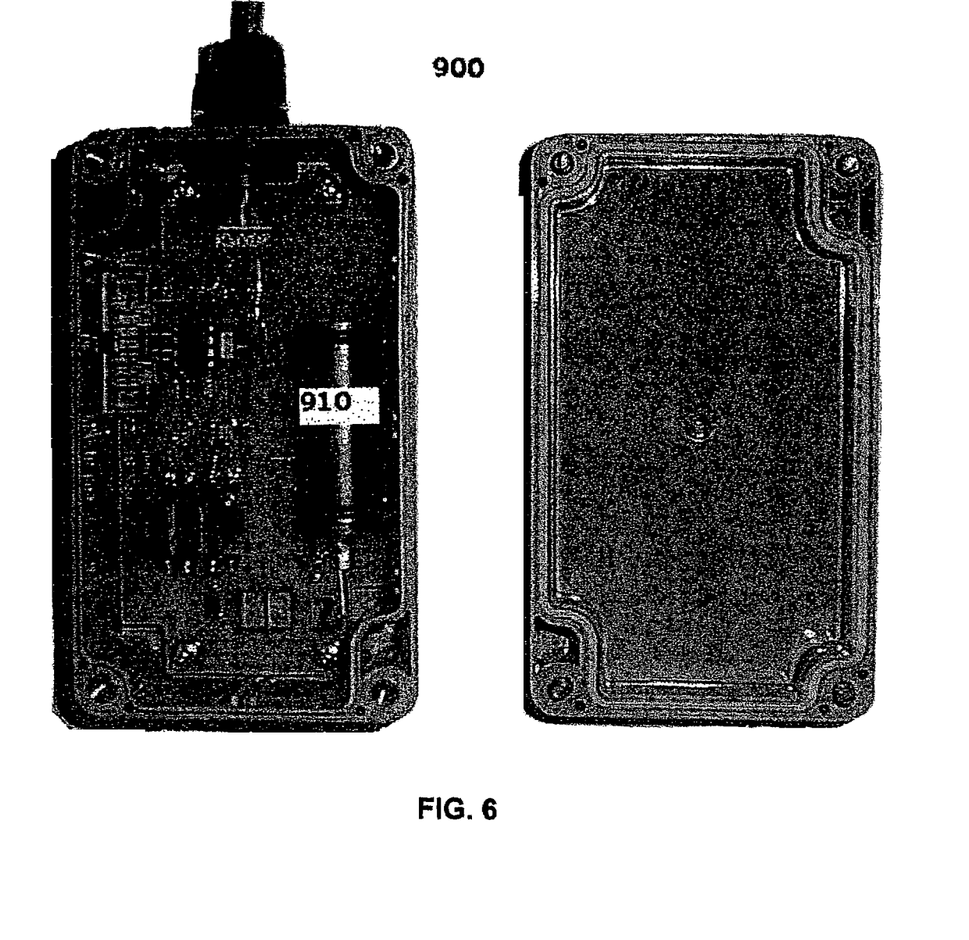
FIG. 6 is a perspective view of one embodiment of the present invention.

Referring now to FIG. 6, the inventive method and apparatus result in a very small manufactured device exemplified by 900. By reducing the number of components exposed to high voltage, by handling all processing digitally, and by eliminating analog filtering components, the overall size of the device becomes limited by the size of a radiation detector 910. Also, the battery size required to operate for long periods of time is significantly reduced because the apparatus operates at low duty cycle as enabled by the inventive method. Overall volume of the inventive apparatus is less that three cubic inches in a low cost device, such that many devices may be deployed at a reasonable investment.

I claim:

1. A method for detecting a radiation level greater than a background radiation level, comprising the steps of:
   detecting an event comprising an elapsed time dT between two radiation pulses;
   incrementing a first threshold event counter if said event is shorter than a first threshold event;
   setting said first threshold event counter to zero if said event is longer than a first threshold event;
   comparing said first threshold event counter to a first counts threshold; and
   outputting a radiation detection alarm if said first threshold event counter exceeds said first counts threshold.

2. The method of claim 1 wherein the first threshold event comprises a mean elapsed time between radiation pulses for a selected radiation level.

3. The method of claim 2 further comprising the step of modifying said mean elapsed time based on a function of said event if said first threshold event counter does not exceed said first counts threshold.

4. The method of claim 3 wherein said modifying step comprises an Infinite Impulse Response Filter.

5. The method of claim 1 wherein said first counts threshold further comprises a number of successive events corresponding to a radiation level that is likely greater than the background radiation level.

6. The method of claim 5 wherein said first counts threshold is determined as a function of a Poisson probability distribution and a desired nuisance rate.

7. The method of claim 6, wherein said desired nuisance rate is less than one per million events.

8. The method of claim 1 further comprising the steps of:
   incrementing a second threshold event counter if said event is shorter than a second threshold event;
   setting said second threshold event counter to zero if said event is longer than a second threshold event;
   comparing said second threshold event counter to a second counts threshold; and
   setting an alarm state if said second threshold event counter exceeds said second counts threshold.

9. The method of claim 8 wherein said second threshold event is a function of said first threshold event and further wherein second counts threshold is a function of said first counts threshold.

10. The method of claim 1 further comprising the steps of:
    detecting a second event comprising a second elapsed time dT between a different two radiation pulses;

comparing said second event to said first event threshold; and clearing said alarm state if said second event is greater than said first event threshold.

11. A method of discriminating between a saturated condition and a fault condition in a radiation detector comprising the steps of:
   monitoring for a discrete radiation trigger pulse from a radiation sensor;
   measuring the electrical current through a power supply to said radiation sensor;
   determining a saturated condition if said monitoring step indicates an absence of a trigger pulse and said measuring step indicates a presence of electrical current; and
   determining a fault condition if said monitoring step indicates the absence of a trigger pulse and said measuring step indicates the absence of electrical current.

12. The method of claim 11 further comprising the steps of:
   outputting a high radiation alert if said saturated condition is determined; and
   outputting a fault alert if said fault condition is determined.

13. A portable radiation detector comprising:
   a radiation sensor;
   a power supply for powering said radiation sensor;
   an input signal indicative of a plurality of discrete radiation events at an output of said radiation sensor; and
   a controller in electrical communication with said input signal, wherein said controller determines a radiation level higher than a background level based on said input signal.

14. The portable radiation detector of claim 13, wherein said controller further determines said radiation level according to the elapsed time between successive radiation events in said plurality of discrete radiation events.

15. The portable radiation detector of claim 14, wherein said controller further determines said radiation level according to a statistical comparison of a set of elapsed times between successive radiation events in said plurality of discrete radiation events to a threshold elapsed time.

16. The portable radiation detector of claim 15, wherein said statistical comparison comprises a Poisson distribution.

17. The portable radiation detector of claim 13, further comprising a second input signal indicative of the electrical current through said power supply.

18. The portable detector of claim 17, wherein said controller further determines whether said detector is in a fault state or a saturation state responsive to said input signal and said second input signal.

19. The portable radiation detector of claim 13, wherein said detector is less than three cubic inches in volume.

20. The portable radiation detector of claim 13 further comprising an alert output responsive to said controller.

* * * * *